Figure 1:
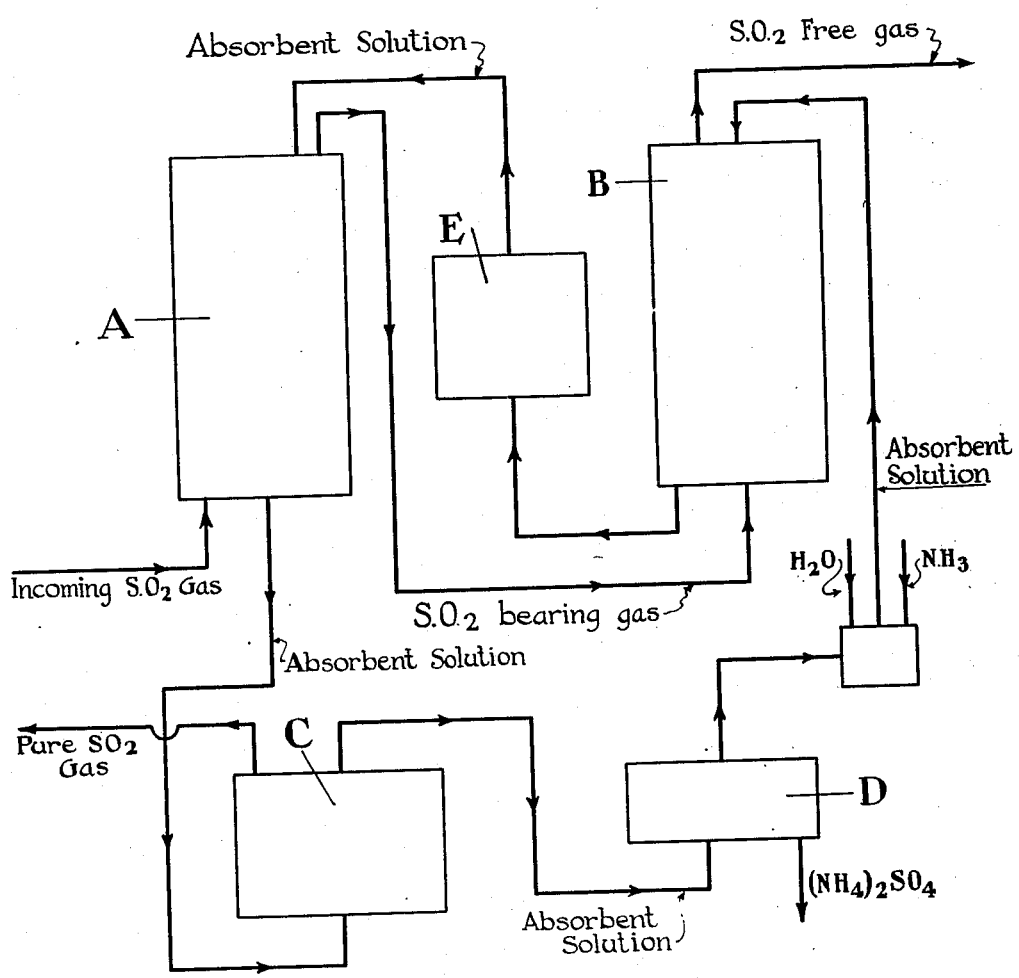

March 4, 1941.   R. LEPSOE   2,233,841
PROCESS FOR RECOVERY OF SULPHUR DIOXIDE FROM GASES
Filed Oct. 28, 1938   2 Sheets-Sheet 1

INVENTOR:
Robert Lepsoe.
per C. Harold Riches.
Attorney

Solubility of ammonium sulphate in ammonium bisulphite (dotted line) and in solutions of bi- and mono sulphite in ratio 87 : 13 (full drawn line).

Strength of solutions indicated by percentage of ammonia combined as bi- and mono-sulphite.

Patented Mar. 4, 1941

2,233,841

UNITED STATES PATENT OFFICE 2,233,841

PROCESS FOR RECOVERY OF SULPHUR DIOXIDE FROM GASES

Robert Lepsoe, Trail, British Columbia, Canada, assignor to The Consolidated Mining & Smelting Company of Canada, Limited, Montreal, Quebec, Canada, a corporation of Canada Application October 28, 1938, Serial No. 237,546
In Canada August 7, 1936

6 Claims. (Cl. 23—178)

My invention relates to a process for the recovery of sulphur dioxide from mixed sulphur dioxide bearing gases, such as those evolved from the roasting and smelting of sulphide ores and concentrates and constitutes a continuation in part of my co-pending application, Serial Number 95,420, filed August 11, 1936.

The invention disclosed in my original application is particularly directed towards providing a simple but extremely effective continuous method for absorbing the sulphur dioxide from mixed sulphur dioxide bearing gases and subsequently liberating the sulphur dioxide in substantially pure form.

In the absorption of sulphur dioxide from sulphur dioxide bearing gases, such as those resulting from the roasting and smelting of sulphide ores or concentrates, sulphur dioxide is absorbed from the gases by means of compounds such as alkali monosulphites to form bisulphites and, on heating, the bisulphites are converted into monosulphites thus regenerating substantially pure sulphur dioxide gas, the process of regeneration and elimination of gas from liquid absorbent being referred to hereinafter as "exorption."

Alkali monosulphites have been found to be superior to other monosulphites as absorbent media and ammonium monosulphite and bisulphite, on account of their extreme solubility, have been found to provide the best absorbent solution. The amount of sulphur dioxide that can be absorbed as bisulphite and again released by boiling is largely governed by the partial pressure of sulphur dioxide, water and, in the case of ammonium monosulphite, of ammonia. In releasing the absorbed sulphur dioxide by boiling, the limit of sulphur dioxide exorption is reached when the pressure of ammonia has attained such value as to form a compound of sulphur dioxide and ammonia which refluxes in the eliminating column. This limit may be reached when the bisulphite-monosulphite ratio approximates 73:27. Before this limit is reached, however, the economic limit of sulphur dioxide exorption is arrived at, beyond which limit progressively larger amounts of steam are required per unit of sulphur dioxide eliminated.

I have found that the economic limit in the steam requirement per unit of sulphur dioxide exorbed is reached when the ratio of sulphur dioxide as bisulphite to sulphur dioxide as monosulphite has been reduced approximately to 87:13, in the case of cycling solutions having concentrations of ammonia, combined as bisulphite and monosulphite, within the preferred concentration range defined hereinafter. In the exorption of such solutions, the lower the concentration of ammonia, combined as bisulphite and monosulphite, the greater will be the steam requirement per unit of sulphur dioxide exorbed, assuming exorption to be continued in each case until the ratio has been reduced to 87:13. I regard a concentration of about 8% ammonia (NH₃), combined as bisulphite and monosulphite, to represent the most desirable lower limit of ammonia concentration in the cycling solution, below which limit operation of the exorption process becomes uneconomical due to the high steam consumption per unit of sulphur dioxide eliminated.

The sulphur dioxide exorption or regeneration stage is actually the reverse process of sulphur dioxide absorption since in the former the absorbent is merely depleted of sulphur dioxide at a higher temperature and a correspondingly higher vapor pressure of sulphur dioxide by means of steam. The gas and steam from the regeneration or exorption step are separated by condensation of the steam at a temperature below 100° C., the sulphur dioxide being removed as substantially pure sulphur dioxide gas saturated with water vapor and the condensate being returned to the circuit.

During the continuous and cyclic process of absorption and exorption there is an appreciable depletion of absorbent due to the formation of undesirable compounds, such as those resulting from the oxidation of sulphite to sulphate by the air, particularly in the absorption stage, and from auto-oxidation of monosulphite and bisulphite, chiefly in the exorption stage. The latter can be regarded as being of small importance as a source of oxidation products provided the time of exorption is reasonably curtailed.

In the case of oxidation of sulphite by air in the absorption stage, sulphate is the principal undesirable compound formed, a small amount of dithionate being formed as well.

I have found that the rate of sulphite oxidation is a function of the concentration of the total sulphites and, although a solution of bisulphite containing no monosulphite is not oxidized, yet mixtures of bisulphite and monosulphite oxidize at a higher rate than that at which monosulphite would oxidize if no bisulphite were present with it in the solution.

During the operation of the absorption and exorption stages of the process, the sulphate formed by oxidation builds up in the solution, from which it ultimately crystallizes out and, if not removed, eventually blocks the conduits to retard or actually prevent further operation of the process.

I have found that the sulphate, formed by oxidation during the operation of the process, may be readily precipitated without the simultaneous precipitation of sulphites and removed from the cycle by means of a simple but highly effective method.

In the operation of my process, the solution containing controlled amounts of sulphate and the other salts, after being cycled through the absorption and exorption stages, is further cycled through a crystallizer, before being returned to the absorption stage. In the crystallizer, cooling is controlled so that sulphate, formed earlier in the cycle in excess of the concentration desired to be maintained in the solution, is the only compound precipitated and is precipitated at a rate equivalent to the rate of formation of sulphate by oxidation elsewhere in the system. Some water may also be removed in the crystallizer by evaporation if desired.

The mother-liquor leaving the crystallizer is replenished by adding to it the total net amount of water evaporated in a complete cycle and an amount of absorbent equivalent to that removed as sulphate. The replenished solution may then be further cooled, if desired, to the temperature prevailing in the absorption stage, before entering the absorption stage. By controlling the temperatures of the various stages throughout the system and the quantity of water evaporated therein as described hereinafter, the process may be operated continuously without the possibility of sulphate becoming precipitated in the system either after replenishment with fresh absorbent or after absorption of sulphur dioxide and, in this manner, blocking up of the system, which would otherwise occur, is avoided.

For the purpose of securing the separation of sulphate solely in the crystallizer, I maintain the solution in an unsaturated condition with respect to ammonium sulphate during the absorption and exorption stages. If it is preferred to effect this with a smaller ammonium sulphate concentration, sufficient concentration of other ammonium salts such as ammonium phosphate may be maintained in the solution to replace part of the usual ammonium sulphate thereby ensuring the depression of the solubility of the remainder of the ammonium sulphate as desired.

This and additional features of my invention and the manner in which I effect their control will be apparent from the following description, reference being had to the accompanying drawings in which the flow sheet of the process is shown schematically and the solubility of ammonium sulphate in sulphite solutions is represented graphically.

Like reference characters refer to like parts throughout the specification and drawing of Figure I.

"A" and "B" are absorption towers in which sulphur dioxide, such as found in mixed gases resulting from the roasting or smelting of sulphide ores or concentrates, is absorbed in a suitable absorbent solution, such as ammonium bisulphite-ammonium monosulphite solution. The mixed gases enter at the base of tower "A" and pass out of the top thereof to enter the base of tower "B," from the top of which tower they pass out substantially free from sulphur dioxide. The number of absorption towers may be varied, of course, and, depending on the circumstances, only one, or more than two, towers may be used.

The absorbent solution enters the top of tower "B" to flow, counter-currently through the mixed gases, to the base thereof where it is withdrawn to pass through the cooler "E." In the cooler "E," the temperature of the solution is lowered to substantially the initial temperature of the absorbent solution entering tower "B." The solution is then passed to the top of the tower "A" to flow counter-currently through the gases in that tower to the base thereof. The solution withdrawn from the base of tower "A" is substantially a solution of ammonium bisulphite and is nearly saturated with respect to sulphate.

The ammonium bisulphite solution is passed into the exorption tower "C," wherein it is heated to drive off substantially pure sulphur dioxide gas and water vapor and at the same time a corresponding amount of ammonium monosulphite is formed in the solution.

During the sulphur dioxide absorption and exorption stages, there is an appreciable amount of oxidation of sulphite to sulphate, largely due to oxidation by air in the absorption stage and partly due to auto-oxidation during the exorption stage. The ammonium monosulphite-ammonium bisulphite solution is withdrawn from the exorption tower "C" and passed into the crystallizer "D" wherein it is cooled to a suitable temperature and, if desired, part of the water may be evaporated. As the solution entering the crystallizer "D" is nearly saturated with sulphate, but is unsaturated with respect to either ammonium bisulphite, ammonium monosulphite or other salts, ammonium sulphate is the only constituent which will crystallize under these conditions and it may be readily separated from the solution without loss of valuable absorbent.

An amount of water, corresponding with the total net amount evaporated and removed in the previous stages, is added to the solution withdrawn from the crystallizer and fresh ammonia, corresponding with that removed as sulphate, is added. The replenished solution is passed to absorption tower "B," wherein it serves to absorb a further amount of sulphur dioxide.

In the operation of my process, the absorbent solution leaving the absorption stage should be saturated with sulphur dioxide at the prevailing temperature and gas concentration in order to operate with maximum efficiency. The bisulphite to monosulphite ratio at this point is substantially 100:0.

I have found that certain conditions must be carefully controlled within certain limits in order to secure separation of sulphate solely in the crystallizer and to prevent the precipitation of bisulphite or monosulphite in the system. In order to prevent the precipitation in the system of bisulphite or monosulphite from highly concentrated solutions of these salts, when these solutions are nearly saturated with respect to ammonium sulphate, I have found that it is necessary to use an absorbent solution containing a concentration of ammonia, combined as bisulphite and monosulphite, which should not exceed approximately 13% of the weight of the solution. There appears to be no critical lower limit, but I have found it preferable to use solutions containing a concentration within the range of from 13% to 8% ammonia, combined as bisulphite and monosulphite, within which range I have found the process may be operated with the most economical steam consumption.

The amount of ammonium sulphate precipitated in the crystallizer is important inasmuch as the amount precipitated must correspond with the amount formed during the absorption and exorption stages. The amount of water evaporated to cause the precipitation of the desired amount of ammonium sulphate per cycle and the temperature to which the solution must be cooled vary under different operating conditions and must be adjusted according to available solubility data.

Figure 2:
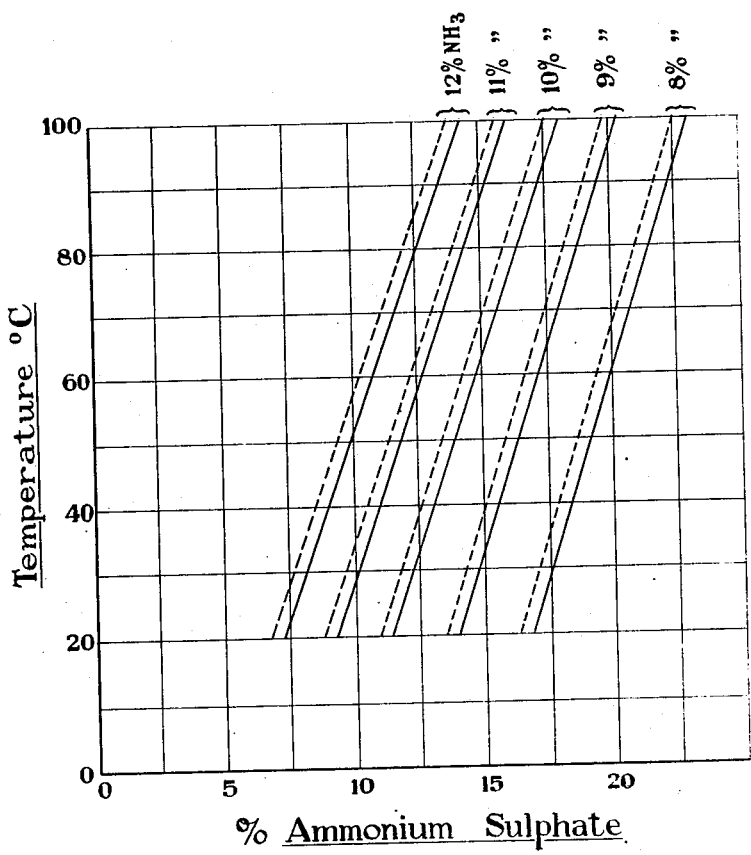

I have further found that the solubility of ammonium sulphate in a concentrated ammonium bisulphite solution saturated with ammonium sulphate varies inversely as the combined ammonia concentration, as shown in Figure 2, which figure also illustrates ammonium sulphate solubilities in bisulphite-monosulphite solutions (87:13 ratio).

The rate of formation of sulphate in the system will depend upon several factors, but for the purpose of illustrating the operation of my process, the rate of formation may be assumed to be constant and the sulphate to be formed only in the absorption stage.

The solution will not become saturated with respect to ammonium sulphate in the absorption and exorption stages provided the temperatures therein are suitably controlled. In the exorption stage, exorption is continued to the most economical extent by removal of definite amounts of water and sulphur dioxide.

By reason of the prevailing concentrations of ammonium bisulphite, and of ammonium monosulphite in the 87:13 ratio range and of ammonium sulphate in the solution resulting from exorption, ammonium sulphate will begin to crystallize out at a definite temperature during cooling in the crystallizer. On further cooling of the solution in the crystallizer, ammonium sulphate will be precipitated out in accordance with the solubility curves shown in Figure 2. This cooling will then be continued to a temperature such that the required amount of ammonium sulphate will be precipitated out. This temperature is determined by calculation and reference to the solubility chart. This part of the process takes place in crystallizer D where, by means of extraneous cooling, a temperature equal to or less than that required for precipitating the correct amount of ammonium sulphate is maintained.

It is clear that the minimum temperature reached in the crystallizer must be such that after replenishment of the solution with water and ammonia, the solution remains unsaturated with regard to sulphate throughout the absorption and subsequent stages, until returned to the crystallizer. Under any particular set of conditions, including the ammonia concentration, the rate of formation of sulphate in solution and the quantity of water which must be added after crystallization to maintain the system in balance, the temperature at which the crystallizer is operated will determine the minimum allowable temperature in the absorption stage. Alternatively, if the minimum temperature of absorption is fixed, then this will determine the maximum temperature at which the crystallizer should be operated.

As a specific example, it was found necessary, in a representative case, to precipitate out 8 grams of ammonium sulphate per kg. of solution leaving the absorption stage per cycle. At this point, the cycling solution contained, per kg. of solution, 102 grams ammonia, combined as bisulphite (10.2% ammonia) and contained 105 grams ammonium sulphate (10.5%). The temperature of this solution was maintained above 20° C. in the absorption stage, this being the temperature at which this particular solution would have become saturated with respect to ammonium sulphate (see curves for bisulphite solution). This solution then entered the exorption stage, wherein it lost 45 grams of sulphur dioxide and 30 grams of water or a total loss in weight of 75 grams. Therefore, leaving the exorption stage there were 925 grams of 11.03% ammonia solution containing 105 grams of ammonium sulphate or 11.35%. From the solubility chart, using the curves for solutions containing bisulphite and monosulphite, in the ratio of 87:13, as defined, it will be seen that ammonium sulphate would not crystallize out in the exorption stage unless the temperature were allowed to fall below 45° C. Generally, it will be found that at the high temperatures prevailing in the exorption stage, there is no danger of crystallization therein. However, the temperature of saturation may be important in some cases, for example, if it should be desired to recover heat by cooling the exorption stage effluent solution in a heat-exchanger.

I prefer to maintain the solution, leaving the exorption stage, in such a condition that it is saturated with respect to ammonium sulphate at a relatively high temperature, to enable as large a temperature gradient as practicable to be employed in the crystallizer. To obtain the solution in this condition before entering the crystallizer, I evaporate in the exorption stage an amount of water equal in weight to at least about four times the weight of ammonium sulphate crystallized out in the crystallizer.

From the exorption stage, the solution proceeds to the crystallizer in which it is required to precipitate 8 grams of ammonium sulphate. The solution leaving the crystallizer thus comprises a total of 917 grams at 11.12% ammonia and contains 97 grams ammonium sulphate, or 10.58%. From the solubility chart, it will be seen that in order to obtain this result, it is necessary to cool to 38° C. in the crystallizer, that is, the crystallizer is maintained at this temperature by extraneous cooling.

After leaving the crystallizer, the solution is replenished by the addition of 30 grams of water to allow for that lost in the exorption stage, and 2 grams of ammonia and 1 gram of water to allow for the removal of water of combination of ammonium sulphate in the crystallizer (solution mechanically removed with the crystals is neglected in this calculation). This results in a total quantity of 950 grams of 10.95% ammonia solution containing 97 grams of ammonium sulphate or 10.21%. This solution will not be saturated with ammonium sulphate above 31° C.

During the subsequent absorption stage, the solution gains 45 grams of sulphur dioxide as such, and 5 grams of sulphur trioxide which is formed from additional sulphur dioxide and oxygen. This combines with the 2 grams of ammonia previously added to form 8 grams of ammonium sulphate. Leaving the absorption stage, the weight of the solution thus totals 1000 grams and contains 105 grams of ammonium sulphate (10.5%) and 102 grams of ammonia combined as sulphites (10.2%). This completes the cycle.

It has been assumed in the preceding example that there is neither gain nor loss of water by the solution during the absorption stage. This might not always be the case in practice, but in such event less or more water would be added to the solution leaving the crystallizer to maintain the whole system in balance.

In the above example, it will be seen that the crystallizer is operated at a temperature such that the saturation temperature of the effluent solution with respect to ammonium sulphate is not more than 7 centigrade degrees (38° C.–31° C.) above the saturation temperature of the solution after it has been replenished with water and ammonia. It will also be seen that the saturation temperature of the replenished solution is not more than 11 centigrade degrees (31° C.–20° C.) above the saturation temperature of the solution leaving the absorption tower. Hence, when the process is operated under the other conditions set forth in the above example, and with a difference of 18 centigrade degrees (7° C. plus 11° C.) between the saturation temperatures of the crystallizer effluent solution and the absorption effluent solution, the danger of ammonium sulphate crystallizing out in parts of the circuit other than the crystallizer is eliminated and the highest operating efficiency is attained under the prevailing conditions.

The maximum permissible difference between the temperature of the crystallizer effluent and the saturation temperature of the absorption effluent in the process varies inversely as a function of the ammonia concentration of the solution and of the amount of ammonium sulphate formed and removed per cycle, and directly as a function of the amount of water evaporated per cycle.

For any particular combination of these conditions, the maximum permissible temperature difference, which I have found should not be exceeded if the process is to be operated continuously without precipitation of sulphites in the system and without precipitation of sulphate elsewhere than in the crystallizer, can readily be ascertained by reference to the solubility data of Figure 2.

For instance, in the above example the maximum permissible temperature difference was shown to be 18 centigrade degrees when the concentration of ammonia was 10.2%, the amount of water evaporated per cycle was 30 grams, and the amount of ammonium sulphate formed and removed per cycle was 8 grams. In this particular case, the crystallizer would be operated at a temperature less than 18 centigrade degrees above the absorption effluent temperature.

In the above example, the crystallizer was maintained at the desired temperature by external cooling. Where it is desired to maintain the crystallizer at the desired temperature by means of vacuum cooling, water vapor and some sulphur dioxide are liberated in the crystallizer as well as in the exorption stage. In this case, the water vapor condensate from each of these sources re-enters the crystallizer effluent solution as before.

It will be understood that the various pieces of apparatus used in the process are designed to satisfy the time requirements of the operation effected therein without interrupting the continuity of the various operations. For example, the absorbent circulating through each of towers B and A does not merely pass through those towers in contact with the sulphur dioxide containing gases and emerge containing the desired sulphur dioxide concentration. The solution is retained in contact with the gases the time interval necessary for it to attain the predetermined sulphur dioxide concentration.

Similarly, a certain time of retention is necessary to effect the exorption and crystallizing steps of the process in order to produce the required results.

Each piece of apparatus is designed, therefore, to treat a sufficient volume of the solution in the required time interval in order to maintain the continuity of the several steps of the process. For example, for a given rate of flow of solution through the entire circuit, the amount of solution entering and leaving each stage of the circuit is approximately the same and is equal to the predetermined flow. Assuming that the time of retention necessary in the exorption and crystallization stages is respectively one-half and three times that in the absorption stage, then for the given rate of flow through the entire circuit, the volume capacity of the exorber must be one half, and that of the crystallizer must be three times, the volume capacity of the absorber.

From the foregoing description it will be clearly understood that various modifications may be made in the operation of my process and the specific apparatus described hereinbefore, without departing from the scope of the appended claims.

Having thus fully described my invention, what I claim as new and desire to secure by Letters Patent is:

1. A continuous process for the absorption and liberation of sulphur dioxide which comprises absorbing sulphur dioxide in a cycling ammonium bisulphite-ammonium monosulphite solution in which the ammonium monosulphite is the active absorbent and the total weight of ammonia in these compounds is not greater than 13% of the weight of the solution, the cycling solution in the absorption stage being maintained nearly saturated with respect to ammonium sulphate and unsaturated with respect to the other salts present; withdrawing the cycling solution from the absorption stage and heating it to expel substantially pure sulphur dioxide and water vapor; cooling the solution to a temperature sufficiently low to crystallize an amount of ammonium sulphate equivalent to that formed by oxidation in the preceding stages; separating and removing the crystallized sulphate; replenishing the solution with water and ammonia and returning the replenished solution to the absorption stage of the process.

2. A continuous process for the absorption and liberation of sulphur dioxide which comprises absorbing sulphur dioxide in a cycling ammonium bisulphite-ammonium monosulphite solution in which the ammonium monosulphite is the active absorbent and the total weight of ammonia in these compounds is not greater than 13% of the weight of the solution, the cycling solution in the absorption stage being maintained nearly saturated with respect to ammonium sulphate and unsaturated with respect to the other salts present; withdrawing the cycling solution from the absorption stage and heating it to expel substantially pure sulphur dioxide and water vapor; cooling the solution to a temperature sufficiently low to crystallize an amount of ammonium sulphate equivalent to that formed by oxidation in the preceding stages; separating and removing the crystallized sulphate; replenishing the solution with water and ammonia, cooling the replenished solution and returning it to the absorption stage of the process.

3. A continuous process for the absorption and liberation of sulphur dioxide which comprises absorbing sulphur dioxide in a cycling ammonium bisulphite-ammonium monosulphite solution in which the ammonium monosulphite is the active absorbent and the total weight of ammonia in these compounds is within the range of from 8% to 13% of the weight of the solution, the cycling solution in the absorption stage being maintained nearly saturated with respect to ammonium sulphate and unsaturated with respect to the other salts present; withdrawing the cycling solution from the absorption stage and heating it to expel substantially pure sulphur dioxide and water vapor; cooling the solution to a temperature sufficiently low to crystallize an amount of ammonium sulphate equivalent to that formed by oxidation in the preceding stages; separating and removing the crystallized sulphate; replenishing the solution with water and ammonia and returning the replenished solution to the absorption stage of the process.

4. A continuous process for the absorption and liberation of sulphur dioxide which comprises absorbing sulphur dioxide in a cycling ammonium bisulphite-ammonium monosulphite solution in which the ammonium monosulphite is the active absorbent and the total weight of ammonia in these compounds is not greater than 13% of the weight of the solution, the cycling solution in the absorption stage being maintained nearly saturated with respect to ammonium sulphate and unsaturated with respect to the other salts present; withdrawing the cycling solution from the absorption stage and heating it to expel water vapor and substantially pure sulphur dioxide gas until the ratio of sulphur dioxide in ammonium bisulphite to that in ammonium monosulphite is reduced to approximately 87:13; cooling the solution to a temperature sufficiently low to crystallize an amount of ammonium sulphate equivalent to that formed by oxidation in the preceding stages; separating and removing the crystallized sulphate; replenishing the solution with water and ammonia and returning the replenished solution to the absorption stage of the process.

5. A continuous process for the absorption and liberation of sulphur dioxide which comprises absorbing sulphur dioxide in a cycling ammonium bisulphite-ammonium monosulphite solution in which the ammonium monosulphite is the active absorbent and the total weight of ammonia in these compounds is within the range of from 8% to 13% of the weight of the solution, the cycling solution in the absorption stage being maintained nearly saturated with respect to ammonium sulphate and unsaturated with respect to the other salts present; withdrawing the cycling solution from the absorption stage and heating it to expel substantially pure sulphur dioxide and water vapor until the ratio of sulphur dioxide in ammonium bisulphite to that in ammonium monosulphite is reduced to approximately 87:13; cooling the solution to a temperature sufficiently low to crystallize an amount of ammonium sulphate equivalent to that formed by oxidation in the preceding stages; separating and removing the crystallized sulphate; replenishing the solution with water and ammonia and returning the replenished solution to the absorption stage of the process.

6. A continuous process for the absorption and liberation of sulphur dioxide which comprises absorbing sulphur dioxide in a cycling ammonium bisulphite-ammonium monosulphite solution in which the ammonium monosulphite is the active absorbent and the total weight of ammonia in these compounds is within the range of from 8% to 13% of the weight of the solution, the cycling solution in the absorption stage being maintained nearly saturated with respect to ammonium sulphate and unsaturated with respect to the other salts present; withdrawing the cycling solution from the absorption stage and heating it to expel substantially pure sulphur dioxide and water vapor until the ratio of sulphur dioxide in ammonium bisulphite to that in ammonium monosulphite is reduced to approximately 87:13; cooling the solution to a temperature sufficiently low to crystallize an amount of ammonium sulphate equivalent to that formed by oxidation in the preceding stages; separating and removing the crystallized sulphate; replenishing the solution with water and ammonia; cooling the replenished solution and returning it to the absorption stage of the process.

ROBERT LEPSOE.